United States Patent [19]

Acker et al.

[11] Patent Number: 5,093,492
[45] Date of Patent: Mar. 3, 1992

[54] METHINE DYES AND OPTICAL RECORDING MEDIUM CONTAINING SAME

[75] Inventors: Michael Acker, Heidelberg; Mathias Dust, Ludwigshafen; Peter Neumann; Sibylle Brosius, both of Mannheim; Klaus D. Schomann, Ludwigshafen; Harald Kuppelmaier, Heidelberg, all of Fed. Rep. of Germany

[73] Assignee: BASF Aktiengesellschaft, Ludwigshafen, Fed. Rep. of Germany

[21] Appl. No.: 563,844

[22] Filed: Aug. 7, 1990

Related U.S. Application Data

[63] Continuation of Ser. No. 322,299, Mar. 13, 1989, abandoned.

[30] Foreign Application Priority Data

Mar. 29, 1988 [DE] Fed. Rep. of Germany ....... 3810642

[51] Int. Cl.$^5$ .................. C09B 23/08; G11B 7/24
[52] U.S. Cl. .................... 544/123; 544/295; 544/300; 430/270; 430/945
[58] Field of Search ............. 430/495, 945, 578, 584, 430/270; 544/123, 295, 300; 346/135.1

[56] References Cited

U.S. PATENT DOCUMENTS

| | | | |
|---|---|---|---|
| 2,955,939 | 10/1960 | Brooker et al. | 430/578 |
| 4,551,413 | 11/1985 | Bell | 430/270 |
| 4,751,309 | 6/1988 | Daltrozzo et al. | 546/176 |
| 4,861,796 | 8/1989 | Hulme-Lowe et al. | 430/945 |

FOREIGN PATENT DOCUMENTS

| | | |
|---|---|---|
| 0101646 | 2/1984 | European Pat. Off. |
| 0102781 | 3/1984 | European Pat. Off. |
| 102781 | 3/1984 | European Pat. Off. |
| 2310559 | 2/1975 | Fed. Rep. of Germany |
| 862445 | 3/1961 | United Kingdom |
| 988627 | 4/1965 | United Kingdom |
| 0217245 | 4/1987 | United Kingdom |
| WO84/02794 | 7/1984 | World Int. Prop. O. |

OTHER PUBLICATIONS

J. Vac. Sci. Technol., vol. 18, No. 1, Jan./Feb. 1981, pp. 92-99; D. G. Howe, et al.

*Primary Examiner*—Charles L. Bowers, Jr.
*Assistant Examiner*—Lee C. Wright
*Attorney, Agent, or Firm*—Oblon, Spivak, McClelland, Maier & Neustadt

[57] ABSTRACT

Methine dyes of the formula

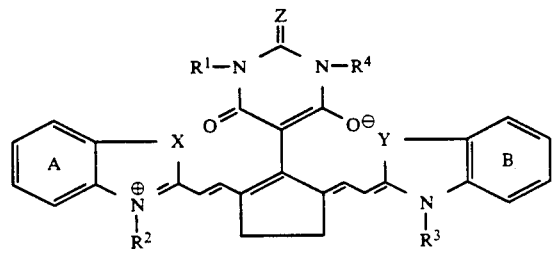

where $R^1$, $R^2$, $R^3$, $R^4$, X, Y and the rings A and B each have specific meanings, and methine dyes obtainable by reacting an organic mono- or polyisocyanate with such a methine dye of the abovementioned formal where only the radicals $R^1$ and/and $R^4$ have a group reacting with an organic mono- or polyisocyanate are useful in optical recording media.

4 Claims, No Drawings

METHINE DYES AND OPTICAL RECORDING MEDIUM CONTAINING SAME

This application is a continuation of application Ser. No. 07/322,299, filed on Mar. 13, 1989, now abandoned.

The present invention relates to methine dyes of the formula I

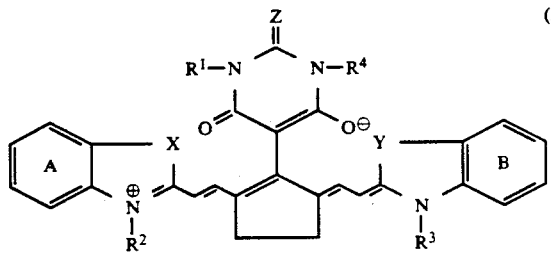

where

R$^1$ and R$^4$ are identical or different and each is independently of the other C$_1$-C$_{22}$-alkyl, which may be unsubstituted or substituted by hydroxyl, phenyl, halogen, C$_1$-C$_4$-alkanoyl, carboxyl, C$_1$-C$_4$-alkanoylamino, C$_1$-C$_4$-alkoxycarbonyl or C$_1$-C$_4$-alkoxycarbonylamino and/or interrupted by one or more oxygen atoms, one or more imino groups or one or more C$_1$-C$_4$-alkylimino groups, R$^2$ and R$^3$ are identical or different and each is independently of the other C$_6$-C$_{22}$-alkyl, which may be unsubstituted or substituted by hydroxyl, phenyl, halogen, C$_1$-C$_4$-alkanoyl, carboxyl, C$_1$-C$_4$-alkanoylamino, C$_1$-C$_4$-alkoxycarbonyl or C$_1$-C$_4$-alkoxycarbonylamino and/or interrupted by one or more oxygen atoms, one or more imino groups or one or more C$_1$-C$_4$-alkylimino groups, or is unsubstituted or C$_1$-C$_4$-alkyl- or halogen-substituted C$_3$-C$_7$-cycloalkyl, X and Y are identical or different and each is independently of the other oxygen, sulfur,

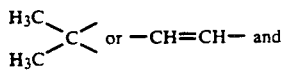

Z is oxygen or sulfur, and the rings A and B may be benzofused and/or substituted by C$_1$-C$_{22}$-alkyl, C$_1$-C$_{12}$-alkoxy, C$_1$-C$_{12}$-alkylthio, cyano, C$_1$-C$_{12}$-mono- or dialkyl-amino, pyrrolidino, piperidino, morpholino, piperazino, N-(C$_1$-C$_4$-alkyl)-piperazino, chlorine or bromine, and to methine dyes obtainable by reacting an organic monoisocyanate or polyisocyanate with those methine dyes of the formula I where only the radicals R$^1$ and/or R$^4$ have a group which reacts with an organic monoisocyanate or polyisocyanate, with the proviso that the radicals R$^2$ and/or R$^3$ can also have the meaning of the abovementioned radical R$^1$ if at least one of the two radicals X and Y is —CH=CH— and/or the methine dyes of the formula I have been reacted with an organic monoisocyanate or polyisocyanate.

The present invention further relates to an optical recording medium which contains a base material and a layer which is sensitive to laser light and contains a dye, said dye being a methine dye as described above.

Recording media which on exposure to radiation of high energy density, for example laser light, undergo a locally confined change of state are known. This thermally initiated change of state, taking for example the form of vaporization, change of flow or fading, entails a change in the optical properties, for example the absorption (through a change in the absorption maximum or the absorbance), which can be utilized for information or data recording.

Suitable light sources for an optical recording medium are for example semiconductor lasers which emit light in the near infrared. Solid state injection lasers, in particular the AlGaAs laser which operates in the wavelength region of from about 650 to 900 nm, are particularly suitable here. There is therefore particular interest in those recording materials which absorb radiation within the wavelength region of from about 650 to 900 nm and can be made into thin, homogeneous layers.

For instance, it is known to use methine dyes which have a cyclopentenylbarbituric acid group as a chain member for this purpose. EP-A-102,781 and U.S. Pat. No. 4,551,413 describe for example some symmetrical heptamethine dyes of this class having 3,3-dimethylindolenine, benzothiazole or benzoxazole end groups.

It is an object of the present invention to provide novel radiation-sensitive products which, in the wavelength region of the semiconductor lasers used, show good reflectance and high absorption. Moreover, they shall be manufacturable in a simple manner, they shall be stable over a long period, and they shall be readily soluble in polymers. It is another object of the present invention to provide a novel optical recording medium where the layers which contain the novel products shall be homogeneous, show good adhesion to the customary base materials and be stable over a long period. Furthermore, these recording media shall be writable to and subsequently readily readable by means of a semiconductor laser and be notable for a very high signal-to-noise ratio.

We have found that these objects are achieved with the methine dyes defined at the beginning and an optical recording medium which contains a base material and a layer which is sensitive to laser light and contains a dye, said dye being a methine dye of the type defined at the beginning.

All the alkyl groups appearing in the abovementioned radicals of the formula I may be not only linear but also branched.

Of alkyl radicals which are interrupted by one or more oxygen atoms, one or more imino groups or one or more C$_1$-C$_4$-alkylimino groups, those where this interruption occurs in each case from 1 to 3 times are preferred.

Suitable radicals R$^1$ and R$^4$ are for example methyl, ethyl, propyl, isopropyl, butyl, isobutyl, sec-butyl, tert-butyl, pentyl, isopentyl, neopentyl, tert-pentyl, benzyl, 1- or 2-phenylethyl, trifluoromethyl, trichloromethyl, bromomethyl, 2-bromoethyl, 1,1,1-trifluoroethyl, heptafluoropropyl, 4-bromobutyl, 2-methoxy-ethyl, 2-ethoxyethyl, 2-propoxyethyl, 2-benzyloxyethyl, 2-ethoxypropyl, 3-ethoxypropyl, 3-benzyloxypropyl, propan-2-on-1-yl, butan-3-on-1-yl, butan-3-on-2-yl, 2-ethylpentan-3-on-1-yl, carboxymethyl, 2-carboxyethyl, 3-carboxypropyl, 4-carboxybutyl, 5-carboxypentyl, 4-carboxy-3-oxabutyl, acetylaminomethyl, 2-(acetylamino)-ethyl, 2-(propionylamino)ethyl, 2-(butyrylamino)ethyl, ethoxycarbonylmethyl, 2-(ethoxycarbonyl)ethyl, 2- or 3-(methoxycarbonyl)propyl, ethoxycarbonylaminomethyl, 2-(ethoxycarbonylamino)ethyl, 2-hydroxyethyl, 2-hydroxypropyl, 3-hydroxypropyl, 2-hydroxybutyl, 4-hydroxybutyl, 2-methylaminoethyl, 2-dimethylaminoethyl, 2-ethylaminoethyl, 2-diethylaminoethyl, 2- or 3-methylaminopropyl or 2- or 3-dimethylaminopropyl.

Suitable radicals $R^1$ and $R^4$, like the radicals $R^2$ and $R^3$, further include for example hexyl, 2-methylpentyl, heptyl, octyl, 2-ethylhexyl, isooctyl, nonyl, isononyl, decyl, isodecyl, undecyl, dodecyl, tridecyl, isotridecyl, tetradecyl, pentadecyl, hexadecyl, heptadecyl, octadecyl, nonadecyl, eicosyl, heneicosyl, docosyl (the designations isooctyl, isononyl, isodecyl and isotridecyl are trivial names derived from the oxo process alcohols [cf. Ullmann's Enzyklopädie der technischen Chemie, 4th edition, volume 7, pages 215 to 217, and volume 11, pages 435 and 436]), 2-butoxyethyl, 3,6-dioxaheptyl, 3,6-dioxaoctyl, 3,6-dioxadecyl, 3,6,9-trioxadecyl, 4-oxa-6-ethyldecyl, 3,6-dioxa-7-phenylheptyl, 6-bromohexyl, 7-bromoheptyl, 8-bromooctyl, 6-hydroxyhexyl, 7-hydroxyheptyl, 8-hydroxyoctyl, 8-phenyloctyl, 10-acetyldecyl, 8-carboxyoctyl, 6-(acetylamino)hexyl, 8-(methoxycarbonyl)octyl or 10-(ethoxycarbonylamino)decyl.

Radicals $R^2$ and $R^3$ are further for example cyclopentyl, cyclohexyl, cycloheptyl, 3-methylcyclopentyl, 3-methylcyclohexyl, 4-ethylcyclohexyl or 2,3-dichlorocyclohexyl.

Suitable organic monoisocyanates and polyisocyanates are all those compounds of this class which have at least one isocyanate group (—N=C=O). These compounds are known per se and are described for example in DE-A-2,310,559 and the references cited therein.

Specific organic monoisocyanates are for example ethyl isocyanate, ethyl isocyanate, propyl isocyanate, butyl isocyanate and phenyl isocyanate.

Suitable organic polyisocyanates are the aliphatic, cycloaliphatic or aromatic polyfunctional isocyanates known per se. Specific examples are: 1,6-hexamethylenediisocyanate, 1-isocyanato-3,3,5-trimethyl-3-isocyanatomethylcyclohexane, isophorone diisocyanate, naphthylene 1,5-diisocyanate, 2,4- or 2,6-hexahydrotoluylene diisocyanate or the corresponding isomeric mixtures, 4,4'- 2,2'- or 2,4'-dicyclohexylmethane diisocyanate or the corresponding isomeric mixtures, mixtures of 4,4'-, 2,2'- and 2,4'-dicyclohexylmethane diisocyanates and polymethylene polycyclohexylene polyisocyanates, 2,4- or 2,6-toluylene diisocyanate or the corresponding isomeric mixtures, 4,4'-, 2,4'- or 2,2'-diphenylmethane diisocyanate or the corresponding isomeric mixtures, mixtures of 4,4'-, 2,4'- and 2,2'-diphenylmethane diisocyanates and polyphenyl-polymethylene polyisocyanates (crude MDI) or mixtures of crude MDI and toluylene diisocyanates.

It is also possible to use modified polyfunctional isocyanates, i.e. products obtained by chemical reaction of the above di- and/or polyisocyanates. Examples are di- and/or polyisocyanates which contain ester, urea, biuret, allophanate, carbodiimide, isocyanurate and/or urethane groups. Specific examples are: aromatic polyisocyanates which contain urethane groups and have NCO contents of from 33.6 to 15% by weight, preferably of from 31 to 21% by weight, for example 4,4'-diphenylmethane diisocyanate or toluylene diisocyanate modified with low molecular weight diols, triols, dialkylene glycols, trialkylene glycols or polyoxyalkylene glycols having molecular weights up to 800, the dior polyoxyalkylene glycols being used individually or as mixtures, examples being diethylene, dipropylene, polyoxyethylene, polyoxypropylene or polyoxypropylene-polyoxyethylene glycols. It is also possible to use NCO-containing prepolymers having NCO contents of from 21 to 9% by weight, preferably of from 21 to 14% by weight. It is similarly possible to use liquid polyisocyanates which contain carbodiimide groups and/or isocyanurate rings and have NCO contents of from 33.6 to 15% by weight, preferably of from 31 to 21% by weight, based for example on 4,4'-, 2,4'- and/or 2,2'-diphenylmethane diisocyanate and/or 2,4- and/or 2,6-toluylene diisocyanate or the corresponding isomeric mixtures, 4,4'-, 2,4'- or 2,2'-diphenylmethane diisocyanates or the corresponding isomeric mixtures, for example of 4,4'- and 2,4'-diphenylmethane diisocyanate, mixtures of diphenylmethane diisocyanates and polyphenyl-polymethylene polyisocyanates (crude MDI) or mixtures of toluylene diisocyanates and crude MDI.

Functional groups capable of reaction with an organic mono- or polyisocyanate, which may appear in the radicals $R^1$ and/or $R^4$, are for example hydroxyl, carboxyl or else imino(-NH-)-interrupted alkyl.

The products of reacting the methine dyes of the formula I with organic mono- or polyisocyanates are, depending on the functional group in the radical $R^1$ and/or $R^4$, for example urethanes —O—CO—NH— (in the case of hydroxyl), amides —CO—NH— (in the case of carboxyl) or ureas —NH—CO—NH— (in the case of imino).

If the radicals $R^1$ and/or $R^4$ have groups capable of reaction with organic mono- or polyisocyanates and these groups are reacted with a polyisocyanate, the product can be oligomeric or polymeric and contain the radical derived from the dye of the formula I more than once.

Preference is given to methine dyes of the formula I where $R^1$ and $R^4$ are each independently of the other $C_1$–$C_{22}$-alkyl, which may be interrupted by from 1 to 3 oxygen atoms, $C_1$–$C_{12}$-hydroxyalkyl or $C_1$–$C_{12}$-carboxyalkyl, $R^2$ and $R^3$ are each independently of the other $C_6$–$C_{22}$-alkyl, which may be interrupted by from 1 to 3 oxygen atoms, $C_6$–$C_{22}$-bromoalkyl, $C_6$–$C_{22}$-carboxyalkyl or ($C_1$–$C_4$-alkoxycarbonyl)-$C_6$–$C_{22}$-alkyl, Z is oxygen, and X, Y and the rings A and B are each as defined above.

Preference is further given to methine dyes of the formula I where $R^2$ is identical to $R^3$, X is identical to Y and the ring A is identical to the ring B.

Preference is similarly given to methine dyes obtainable by reacting an organic mono- or polyisocyanate with those methine dyes of the formula I where only the radical $R^4$ has a group which reacts with an organic mono- or polyisocyanate. Particularly noteworthy here are those methine dyes which are obtainable by reaction with a methine dye of the formula I where $R^4$ is $C_1$–$C_{22}$-hydroxyalkyl.

Particular preference is given to methine dyes of the formula I where $R^1$ and $R^4$ are each independently of the other $C_1$–$C_{12}$-alkyl, which may be interrupted by from 1 to 3 oxygen atoms, or $C_1$–$C_{12}$-hydroxyalkyl, $R^2$ and $R^3$ are each independently of the other $C_6$–$C_{12}$-alkyl, which may be interrupted by from 1 to 3 oxygen atoms, Z is oxygen, the rings A and B are each unsubstituted or substituted by chlorine, and X and Y are each as defined above.

Particular preference is further given to those methine dyes which are obtainable by reacting the last-mentioned methine dyes with an organic mono- or polyisocyanate in a reaction where only R is involved.

The novel dyes of the formula I can be prepared in a conventional manner, for example as described in U.S. Pat. No. 2,955,939. For instance, a cycloammonium compound of the formula IIa and/or IIb

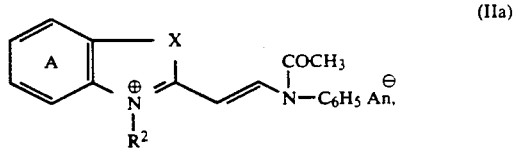

(IIa)

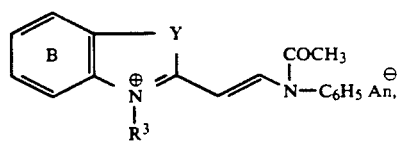

(IIb)

where the rings A and B, $R^2$ and $R^3$ are each as defined above and $An^\ominus$ is an inorganic or organic anion (for example chloride, bromide, iodide, tetrafluoroborate, methosulfate or p-toluenesulfonate), is condensed with a barbituric acid derivative of the formula III

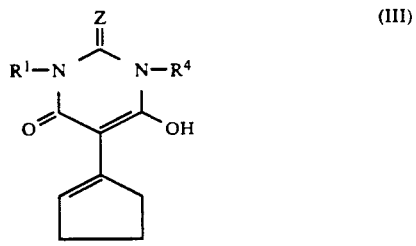

(III)

where $R^1$, $R^4$ and Z are each as defined above.

The condensation takes place for example in an inert organic solvent (for example ethanol, propanol, butanol or a mixture thereof) at from 80° to 120° C. in the presence of a base (for example triethylamine, pyridine, morpholine or piperidine). It is advantageous to use cycloammonium compound II, barbituric acid derivative III and base in a molar ratio of from 1:1:1 to 2:1:2.

The compounds of the formulae II and III used as starting materials are known or can be prepared in a known manner, for example as described in A. Weissberger, E. C. Taylor, Chemistry of Heterocyclic Compounds, Volume 30, Interscience Publishers, 1977.

The reaction of a methine dye I with an organic mono- or polyisocyanate is likewise effected in a conventional manner. To this end, a suitable methine dye of the formula I is reacted with an organic mono- or polyisocyanate in an inert organic solvent (for example methylene chloride, 1,1,2-trichloroethane, toluene, naphtha or cyclohexanone) at from 20° to 60° C. in the presence or absence of a catalyst (for example tertiary amines, tetraalkylammonium hydroxides or organic tin compounds). The molar ratio for this reaction depends on the functionality of the isocyanate. In general, per equivalent of isocyanate approximately one equivalent of the dye capable of reaction will be used.

The novel methine dyes show strong molar absorption within the region from 700 to 900 nm. They are readily soluble in organic solvents and/or thermoplastics or crosslinked plastics.

The present invention further provides an optical recording medium which contains a base and a layer which is sensitive to laser light and contains a dye, said dye being a methine dye as defined above.

The construction of the recording media is known per se (see for example J. Vac. Sci. Technol. 18 (1), 1981, 105).

Suitable bases are for example glass plates or disks or plastics plates or disks, in particular plates or disks made of polymethyl methacrylate, polystyrene, polystyrene copolymers, polyvinyl chloride, polymethylpentene or polycarbonate, with or without tracking grooves.

This base may have the shape of a tape, a square or a rectangular plate or preferably a round disk, preference being given to the disks 10 or 13 cm in diameter customary and known for laser-optical recording materials.

The recording medium according to the invention can be free of binders. Preferably, however, the recording medium does contain a binder. Suitable binders are for example silicone resins, epoxy resins, acrylate resins, polystyrene homopolymers and copolymers, polyvinylcarbazole, polyvinylpyrrolidone, polyvinyl ester copolymers, polyvinylidene chloride copolymers and polyvinyl chloride.

Between the light-absorbing layer and the base there may be present a reflecting layer, so that any incident light passing through the colored layer is, if it is not absorbed, reflected at the reflector layer and passes once more through the colored layer.

Irradiation may also take place through a transparent substrate, in which case the layers can then be arranged in the order substrate/absorber layer/optional reflector layer.

Suitable light-reflecting materials are for example aluminum, rhodium, gold, tin, lead, bismuth, copper and dielectric mirrors. The light-reflecting layer should be sufficiently thick to reflect as much as possible of the recording or sensing light.

Mirrors of low heat conductivity are advantageous for this purpose. The base of the light-reflecting layer must have an optically smooth, flat surface and be so constituted at the surface that the absorbing layer is firmly adherrent thereon. In order to influence the surface quality and the adhesion characteristics in a favorable direction, the base and/or the reflector may be coated with a planarizing layer of a thermosetting or thermoplastic material.

If the optical recording medium has a metallic reflector, this metallic reflector layer is preferably applied in a conventional manner, for example by vacuum vapor deposition or else by applying suitable metal foils to the base.

The recording medium according to the invention is produced by spincoating a solution containing one of the above-described methine dyes, an optional polymeric binder and a solvent onto a base and air-drying the layer. The film may also be dried under reduced pressure, at elevated temperatures or, where appropriate, by radiation.

Suitable solvents are for example 1,1,2-trichloroethane, methyl ethyl ketone, diacetone alcohol, toluene, methanol, ethanol or propanol and mixtures thereof.

If necessary, the spincoating solution may contain additives, such as antioxidants, singlet oxygen quenchers or UV absorbers.

Furthermore, it is also possible to apply a protective layer on top of the dye-in-polymer layer. There are a number of possible polymers for this purpose, which may be applied by spincoating, knife coating, dipping in dissolved polymers or vacuum vapor deposition, in particular in the case of fluorinated polymers, to form a protective layer.

If the recording system is constructed of two identical or different recording media in the form of a sandwich, it is in general possible to dispense with any protective layer. In addition to higher mechanical and rotation-dynamical stability, the sandwich construction offers the advantage of twice the storage capacity.

The protective and/or intermediate layer may customarily be dispensed with if the optical recording medium is of sufficient quality. If, however, intermediate layers cannot be dispensed with, their thickness must be chosen to be such that, having regard to the refractive index of the material and the laser light wavelength used, no troublesome interference can arise.

The optical recording medium according to the invention is strongly absorbing at the wavelength of commercial semiconductor lasers (from about 650 to 900 nm). The dye-in-polymer systems can be applied to a light-reflectant layer in such a way as to give smooth, homogeneous absorption layers of high optical quality which possess a favorable threshold energy and into which the information to be stored can be written in the form of pits; these properties make for an excellent signal-to-noise ratio.

The recording media of the present invention are writable and readable with a semiconductor laser. Recording media according to the invention are very stable to atmospheric effects and daylight.

Owing to the high light absorption of the novel methine dyes, the novel recording media are very sensitive to light from solid state injection lasers which emit in the near infrared. A specific instance here is the AlGaAs laser which emits within the wavelength region from about 650 to 950 nm. Owing to the smallness of the device, its low energy requirements and the possibility of directly modulating the optical output power by modulation of the electrical drive current, these types of lasers are particularly highly suitable.

The Examples below illustrate the invention in more detail.

A. PREPARATION OF THE DYES

EXAMPLE 1

19.6 ml of triethylamine were added to a solution of 55.3 g (70 mmol) of 3,3-dimethyl-1-n-dodecyl-2-[2-(N-acetylanilino)vinyl]indolenium iodide and 11.3 g (35 mmol) of 5-(cyclopenten-1-yl)-1-hydroxyethyl-3-hexylbarbituric acid in 280 ml of absolute ethanol. The reaction solution was then refluxed for 30 minutes and subsequently concentrated under reduced pressure, and the residue was stirred with boiling acetone. After cooling down to room temperature, the solution was cooled in methanol/dry ice, and the precipitated crude dye was filtered off with suction and washed first with acetone and then with ether. It was purified by chromatography over silica gel using 20:1 methylene chloride/isopropanol as mobile phase, with the first green fraction giving 350 mg of the monoacetylated dye 1 a and the second, likewise green zone giving 3.1 g of dye 1 b.

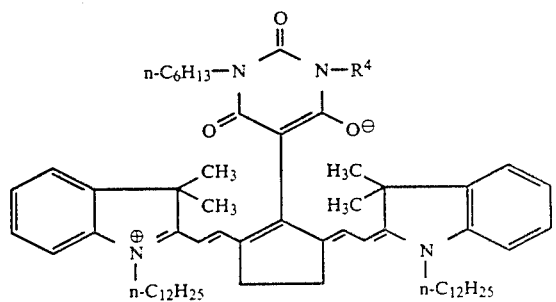

Dye 1a: $R^4 = C_2H_4-OCOCH_3$

Dye 1b: $R^4 = C_2H_4-OH$

Absorption maximum [nm] (in ethanol)

Dye 1a: 785, $\epsilon = 319600$

Dye 1b: 785, $\epsilon = 301112$

The dyes listed below were prepared similarly to Example 1. The solvent used in the determination of the absorption maximum is likewise stated, Ac denoting acetyl, MeOH methanol, EtOH ethanol and THF tetrahydrofuran. The residue $C_3H_6OC_8H_{17}$ represents

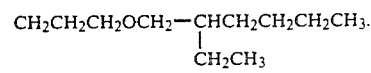

TABLE 1

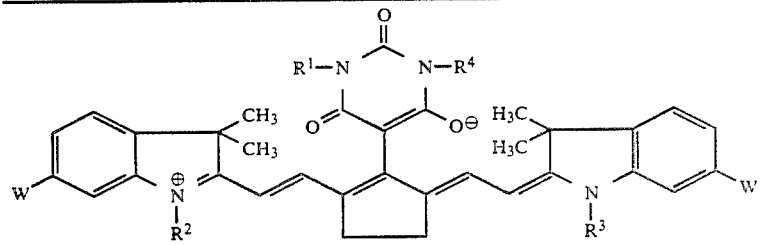

| Bsp.-Nr. | $R^1$ | $R^4$ | W | $R^2, R^3$ | λmax [nm] | ε |
|---|---|---|---|---|---|---|
| — | n-C$_4$H$_9$ | C$_2$H$_4$OH | H | n-C$_6$H$_{13}$ | | |
| | n-C$_6$H$_{13}$ | C$_2$H$_4$OH | H | n-C$_6$H$_{13}$ | | |
| | n-C$_4$H$_9$ | C$_2$H$_4$OH | H | n-C$_{12}$H$_{25}$ | 786 (EtOH) | 324 034 |
| 5 | C$_2$H$_4$OH | C$_2$H$_4$OH | H | n-C$_8$H$_{17}$ | | |
| 6 | C$_2$H$_4$OH | C$_2$H$_4$OAc | H | n-C$_8$H$_{17}$ | | |
| 7 | n-C$_6$H$_{13}$ | C$_2$H$_4$OH | H | C$_2$H$_4$OC$_2$H$_4$OC$_2$H$_5$ | 781 (MeOH) | 189 800 |
| 8 | n-C$_6$H$_{13}$ | C$_2$H$_4$OH | Cl | C$_{12}$H$_{25}$ | | |
| 9 | n-C$_4$H$_9$ | C$_3$H$_6$OC$_8$H$_{17}$ | H | CH$_2$CH(C$_2$H$_5$)C$_4$H$_9$ | | |

TABLE 1-continued

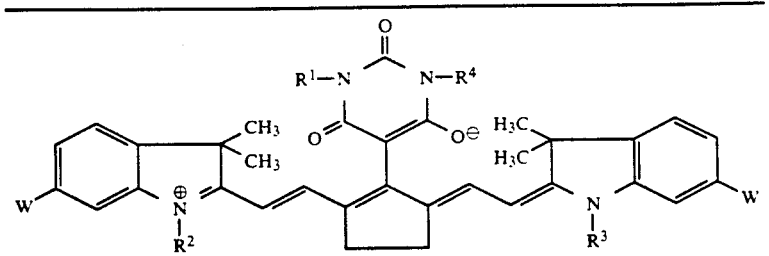

| Bsp.-Nr. | R¹ | R⁴ | W | R², R³ | λmax [nm] | ε |
|---|---|---|---|---|---|---|
| 10 | C₃H₆OC₈H₁₇ | C₃H₆OC₈H₁₇ | H | CH₂CH(C₂H₅)C₄H₉ | | |

TABLE 2

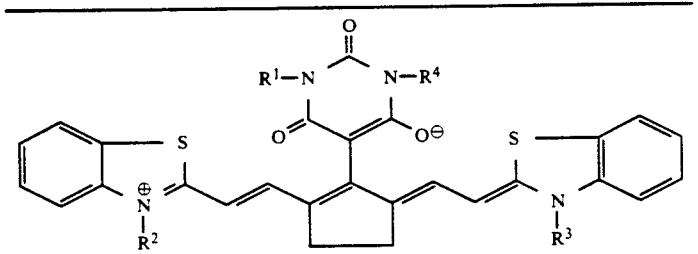

| Bsp.-Nr. | R¹ | R⁴ | R², R³ | λmax [nm] | ε |
|---|---|---|---|---|---|
| | n-C₆H₁₃ | C₂H₄OH | n-C₆H₁₃ | | |
| | n-C₄H₉ | C₂H₄OH | n-C₆H₁₃ | | |
| 13 | n-C₆H₁₃ | C₂H₄OH | n-C₈H₁₇ | | |
| 14 | n-C₆H₁₃ | C₂H₄OH | n-C₆H₁₃ | | |
| 15 | n-C₆H₁₃ | C₂H₄OH | n-C₆H₁₃ | | |
| 16 | C₂H₄OAc | C₂H₄OAc | CH₂CH(C₂H₅)C₄H₉ | | |
| 17 | n-C₆H₁₃ | C₂H₄OH | (CH₂)₈OH | 816 (CH₂Cl₂) | |
| 18 | n-C₆H₁₃ | C₂H₄OH | C₂H₄OC₂H₄OC₂H₅ | 816 (CH₂Cl₂) | |
| 19 | n-C₄H₉ | C₃H₆OC₈H₁₇ | n-C₆H₁₃ | | |
| 20 | C₃H₆OC₈H₁₇ | C₃H₆OC₈H₁₇ | n-C₈H₁₇ | | |

EXAMPLE 21

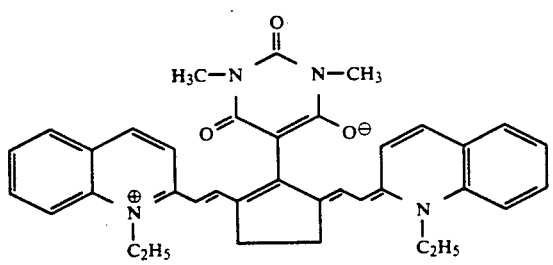

λmax [nm] = 888 (CH₂Cl₂)

ε = 232 200

EXAMPLE 22

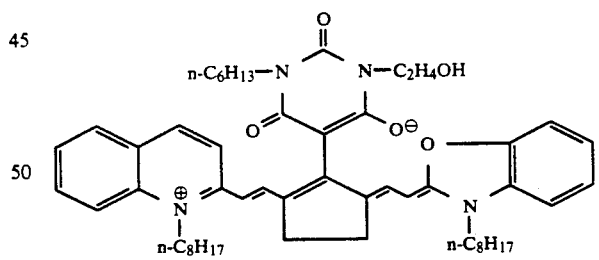

EXAMPLE 23

0.5 g (0.5 mmol) of dye 1 b (Example 1) was added to a solution of 0.145 g of a trimerized hexamethylene diisocyanate (NCO number 22.1) in 40 ml of absolute methylene chloride, and the reaction solution was stirred at room temperature in the absence of moisture for 48 hours. The reaction solution was then concentrated under reduced pressure, and the residue was taken up in methyl tert-butyl ether and filtered off with suction. 0.5 g of an oligomeric dye was obtained.

UV:λ$_{max}$=770 nm in methylene chloride.

The method of Example 23 was also used to react dyes 2, 3, 4, 5, 6, 11, 12, 14, 15, 16, 17, 18, 19, 20, 21 and 22 with trimerized hexamethylene diisocyanate. B. Preparation of the optical recording medium

APPLICATION EXAMPLE 1

0.0516 g of a styrene-acrylonitrile copolymer was dissolved in 0.464 g of 1,1,2-trichloroethane and 0.1204 g of dye No. 8 was added, followed by a further 7.96 g of 1,1,2-trichloroethane. The mixture was then stirred at room temperature for 1 hour and filtered, and the filtrate was spincoated onto a polymethyl methacrylate (PMMA) substrate at 2,000 rpm.

The layer was homogeneous and flawless. Its thickness was 135 nm and it had a broad absorption band. At 830 nm the absorbance was 0.9.

An AlGaAs laser ($\lambda = 820$ nm) mounted on a turntable was used to write individual pits about $1\mu$ in size into the active layer. The sensitivity of the layer was better than 1 nJ/pit. On reading back the dots an excellent signal-to-noise ratio was found.

APPLICATION EXAMPLE 2

0.8 g of oligomerized dye No. 23 was admixed with 9.2 g of 1,1,2-trichloroethane, and the mixture was stirred at room temperature for 15 minutes. It was then filtered, and the filtrate was spincoated onto a PMMA substrate at 3,000 rpm.

The layer was very homogeneous and showed a broad absorption band with a maximum at 810 nm.

An AlGaAs laser ($\lambda = 820$ nm) mounted on a turntable was used to write individual pits about $1\mu$ in size into the active layer. The sensitivity of the layer was better than 1 nJ/pit. On reading back the dots an excellent signal-to-noise ratio was found.

We claim:

1. A methine dye of the formula I

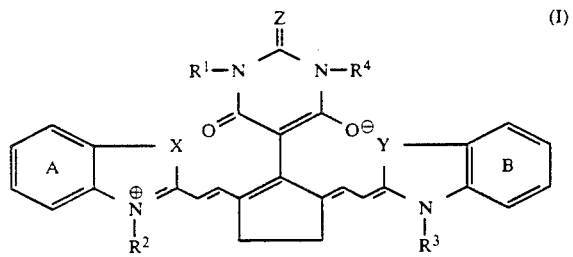

where $R^1$ and $R^4$ are identical or different and each is independently of the other $C_1-C_{22}$-alkyl, which may be unsubstituted or substituted by hydroxyl, phenyl, halogen, $C_1-C_4$-alkanoyl, carboxyl, $C_1-C_4$-alkanoylamino, $C_1-C_4$-alkoxycarbonyl or $C_1-C_4$-alkoxycarbonylamino and/or interrupted by one or more oxygen atoms, one or more imino groups or one or more $C_1-C_4$-alkylimino groups, $R^2$ and $R^3$ are identical or different and each is independently of the other $C_6-C_{22}$-alkyl, which may be unsubstituted or substituted by hydroxyl, phenyl, halogen, $C_1$14 $C_4$-alkanoyl, carboxyl, $C_1-C_4$-alkanoylamino, $C_1-C_4$-alkoxycarbonyl or $C_1-C_4$-alkoxycarbonylamino and/or interrupted by one or more oxygen atoms, one or more imino groups or one or more $C_1-C_4$alkylimino groups, or is unsubstituted $C_5-C_7$-cycloalkyl, or $C_1-C_4$-alkyl-, $C_5-C_7$-cycloalkyl, or halogen-substituted $C_5-C_7$-cycloalkyl, X and Y are identical or different and each is independently of the other oxygen, sulfur,

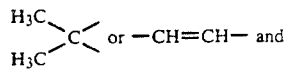

Z is oxygen or sulfur, and the rings A and B may be benzofused and/or substituted by $C_1-C_{22}$-alkyl, $C_1-C_{12}$-alkoxy, $C_1-C_{12}$-alkylthio, cyano, $C_1-C_{12}$-mono- or dialkyl-amino, pyrrolidino, piperidino, morpholino, piperazino, N-($C_1-C_4$-alkyl)-piperazino, chlorine or bromine, and a methine dye obtainable by reacting an organic monoisocyanate or polyisocyanate with a methine dye of the formula I where only the radicals $R^1$ and/or $R^4$ have a group which reacts with an organic monoisocyanate or polyisocyanate, with the proviso that the radicals $R^2$ and/or $R^3$ can also have the meaning of the abovementioned radical $R^1$ if at least one of the two radicals X and Y is —CH=CH— and/or the methine dye of the formula I has been reacted with an organic monoisocyanate or polyisocyanate.

2. A methine dye of the formula I as claimed in claim 1, where $R^1$ and $R^4$ are each independently of the other $C_1-C_{22}$-alkyl, which may be interrupted by from 1 to 3 oxygen atoms, $C_1-C_{12}$-hydroxyalkyl or $C_1-C_{12}$-carboxyalkyl, $R^2$ and $R^3$ are each independently of the other $C_6-C_{22}$-alkyl, which may be interrupted by from 1 to 3 oxygen atoms, $C_6-C_{22}$-bromoalkyl, $C_6-C_{22}$-carboxyalkyl or ($C_1-C_4$-alkoxycarbonyl)-$C_6-C_{22}$-alkyl, Z is oxygen, and X, Y and the rings A and B are each as defined in claim 1.

3. A methine dye of the formula I as claimed in claim 1, where $R^1$ and $R^4$ are each independently of the other $C_1-C_{12}$-alkyl, which may be interrupted by from 1 to 3 oxygen atoms, or $C_1-C_{12}$-hydroxyalkyl, $R^2$ and $R^3$ are each independently of the other $C_6-C_{12}$-alkyl, which may be interrupted by from 1 to 3 oxygen atoms, Z is oxygen, the rings A and B are each unsubstituted or substituted by chlorine, and X and Y are each as defined in claim 1.

4. A methine dye as claimed in claim 1 obtainable by reacting an organic mono- or polyisocyanate with a methine dye of the formula I where only the radical $R^4$ has a group which reacts with an organic mono- or polyisocyanate and $R^4$ is $C_1-C_{22}$-hydroxyalkyl.

* * * * *

UNITED STATES PATENT AND TRADEMARK OFFICE
CERTIFICATE OF CORRECTION

PATENT NO. : 5,093,492

DATED : March 3, 1992

INVENTOR(S) : Michael Acker et al.

It is certified that error appears in the above-identified patent and that said Letters Patent is hereby corrected as shown below:

On the title page, Item [75]
The second inventor's name is spelled incorrectly, should be, --Matthias Dust--.

Signed and Sealed this

Twenty-second Day of June, 1993

Attest:

MICHAEL K. KIRK

*Attesting Officer*     *Acting Commissioner of Patents and Trademarks*